(12) United States Patent
Lawrence et al.

(10) Patent No.: US 7,489,270 B2
(45) Date of Patent: Feb. 10, 2009

(54) GNSS LINE BIAS MEASUREMENT SYSTEM AND METHOD

(75) Inventors: David Gary Lawrence, Santa Clara, CA (US); Kurt Zimmerman, Mountain View, CA (US); Paul Yalden Montgomery, Menlo Park, CA (US); Henry Stewart Cobb, Palo Alto, CA (US)

(73) Assignee: Novariant, Inc., Fremont, CA (US)

( * ) Notice: Subject to any disclaimer, the term of this patent is extended or adjusted under 35 U.S.C. 154(b) by 246 days.

(21) Appl. No.: 11/106,962

(22) Filed: Apr. 15, 2005

(65) Prior Publication Data

US 2006/0244656 A1    Nov. 2, 2006

(51) Int. Cl.
*G01S 1/00* (2006.01)
*G01C 21/00* (2006.01)

(52) U.S. Cl. .................... 342/357.06; 701/215
(58) Field of Classification Search .............. 342/417, 342/411, 442, 357.06; 701/215
See application file for complete search history.

(56) References Cited

U.S. PATENT DOCUMENTS

| | | | | | |
|---|---|---|---|---|---|
| 5,268,695 | A * | 12/1993 | Dentinger et al. | ...... | 342/357.11 |
| 5,347,286 | A * | 9/1994 | Babitch | ...... | 342/359 |
| 5,663,735 | A * | 9/1997 | Eshenbach | ...... | 342/357.15 |
| 6,005,514 | A * | 12/1999 | Lightsey | ...... | 342/365 |
| 6,061,631 | A | 5/2000 | Zhang | | |
| 6,081,700 | A * | 6/2000 | Salvi et al. | ...... | 455/193.3 |
| 6,114,988 | A * | 9/2000 | Schipper et al. | ...... | 342/357.06 |
| 6,163,754 | A * | 12/2000 | Zhang et al. | ...... | 701/215 |
| 6,255,986 | B1 * | 7/2001 | Alberty et al. | ...... | 342/174 |
| 6,373,909 | B2 * | 4/2002 | Lindquist et al. | ...... | 375/346 |
| 6,590,528 | B1 * | 7/2003 | DeWulf | ...... | 342/357.12 |
| 6,700,536 | B1 * | 3/2004 | Wiegand | ...... | 342/417 |
| 6,720,914 | B2 * | 4/2004 | Toda et al. | ...... | 342/357.04 |
| 6,754,584 | B2 * | 6/2004 | Pinto et al. | ...... | 701/215 |
| 6,970,128 | B1 * | 11/2005 | Dwelly et al. | ...... | 342/25 F |
| 7,224,717 | B1 * | 5/2007 | Lam et al. | ...... | 375/144 |
| 2001/0040932 | A1 * | 11/2001 | Lindquist et al. | ...... | 375/346 |
| 2002/0072852 | A1 * | 6/2002 | Fuchs et al. | ...... | 701/213 |
| 2003/0095069 | A1 * | 5/2003 | Stilp | ...... | 342/465 |
| 2003/0112180 | A1 * | 6/2003 | Wight | ...... | 342/374 |
| 2004/0160364 | A1 * | 8/2004 | Regev | ...... | 342/432 |
| 2004/0176102 | A1 * | 9/2004 | Lawrence et al. | ...... | 455/456.1 |
| 2005/0094741 | A1 * | 5/2005 | Kuroda | ...... | 375/267 |

OTHER PUBLICATIONS

Elkaim, Gabriel H. et al., "System Identification of a Farm Vehicle Using Carrier-Phase Differential GPS," Stanford University, 1997, 10 pages.
Townsend, Bryan et al., "L1 Carrier Phase Multipath Error Reduction Using MEDLL Technology," ION, Palm Springs, CA, Sep. 13-15, 1995, pp. 1-2.

* cited by examiner

*Primary Examiner*—Thomas H Tarcza
*Assistant Examiner*—Harry Liu
(74) *Attorney, Agent, or Firm*—Houston Eliseeva LLP

(57) ABSTRACT

A number of solutions for deriving the line bias are disclosed. Some of these solutions utilize signal processing and judicious selection of the frequency plan used in the position detection systems to either enable the derivation of the line bias, or make the measurements insensitive to line bias. In other examples, the present invention utilizes measurement schemes for deriving the line bias and enabling a position detection system to process line bias information in order to find a position solution.

14 Claims, 5 Drawing Sheets

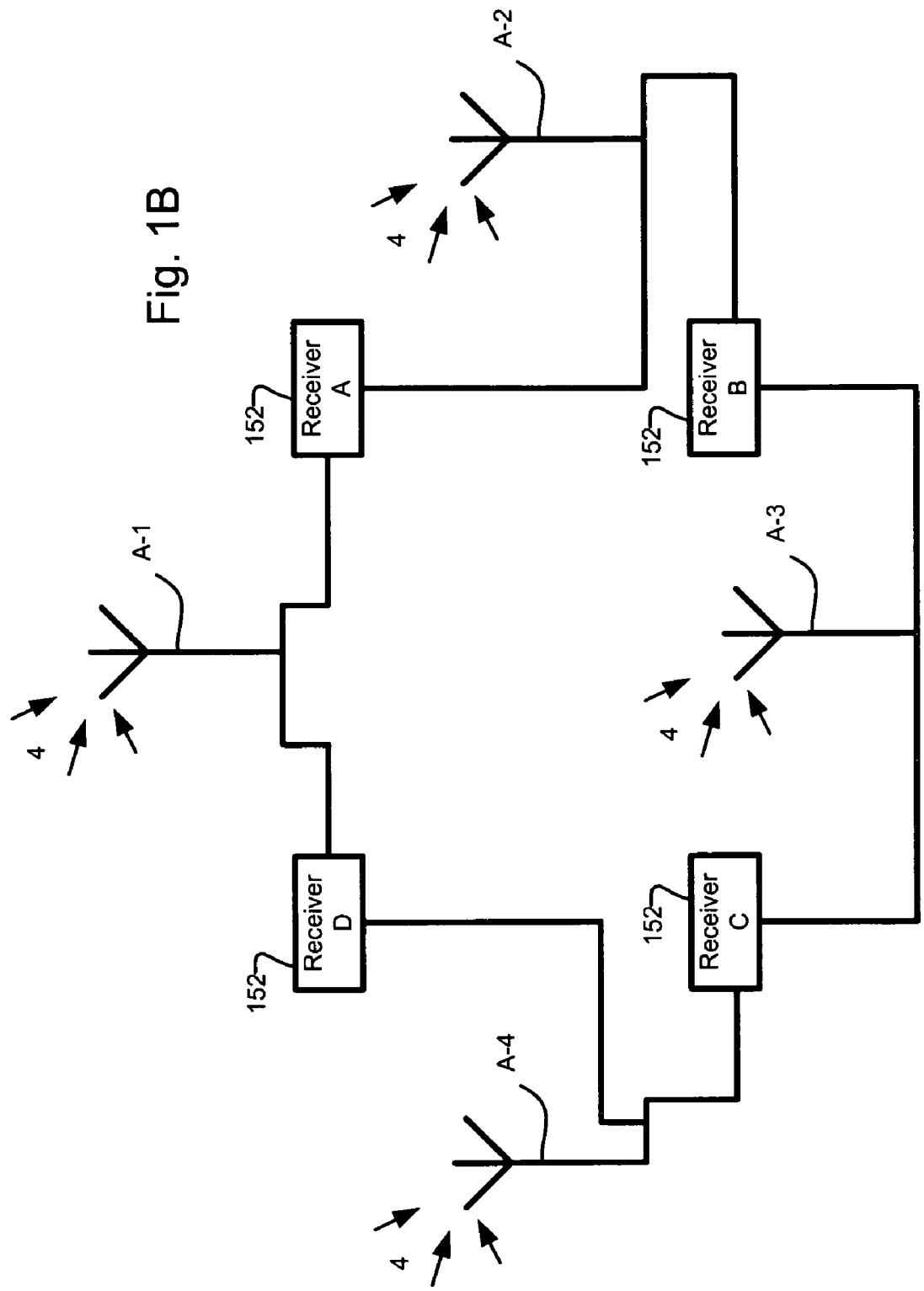

GNSS LINE BIAS MEASUREMENT SYSTEM AND METHOD

BACKGROUND OF THE INVENTION

The NAVSTAR Global Positioning System (GPS) is a satellite-based navigation system developed by the U.S. military in the 1970's. The GPS space segment consists of a nominal constellation of 24 satellites, four satellites in each of 6 orbit planes.

Originally conceived as a navigation aid for ships, the use of the system has become ubiquitous both within the military and within civilian and commercial applications. For example, many cars today are outfitted with GPS navigation systems that locate the car on a displayed digital map to the driver. In commercial applications, GPS systems are used for surveying in addition to controlling vehicles such as graders during the laying of road beds. On these vehicles, the antennas are sometimes located on the blade in addition to the cab. In order to ensure good satellite visibility, however, the antennas must be placed on high poles to provide line of sight to the required four satellites.

The Standard Positioning Service (SPS) signal is currently provided to civilian users of GPS. It is made up of an L-band carrier at 1575.42 megahertz (MHz) (referred to as the L1 carrier) modulated by a pseudorandom noise (PRN) C/A (clear acquisition) code. The satellites are distinguished from each other by their unique C/A codes, which are nearly orthogonal to each other. The C/A code has a chip rate of 1.023 MHz and is repeated every millisecond. A 50 bit per second data stream is modulated with the C/A code to provide satellite ephemeris and health information. The phase of the C/A code provides a measurement of the range to the satellite. This range includes an offset due to the receiver clock and is therefore referred to as the pseudo-range.

Consequently, to perform a three dimensional position fix, a GPS position detection system traditionally requires a minimum of four satellites: one satellite phase measurement for each of the unknowns; and since the receiver clock error is common to all satellites, it represents an additional unknown for which a solution is required. The positioning accuracy provided by the SPS is on the order of ten meters. Due to geometric effects, vertical errors are typically larger than horizontal errors.

Other global positioning systems exist in addition to the NAVSTAR GPS. Within the GNSS (Global Navigation Satellite System) are the Russian GLONASS and the forthcoming European GALILEO GPS systems. Position detection systems can use one or more of these systems to generate position information.

Differential GPS (DGPS) is a variant method for providing higher positional accuracy. If a reference GPS receiver is placed at a known location on the ground, the bulk of the errors associated with the satellite phase measurements can be estimated. Phase corrections can be calculated and broadcast to a roving GPS user. Since most errors are highly correlated in a local area, the roving user's position solution after applying the corrections will be greatly improved.

Traditional DGPS systems use the C/A code phase measurements to arrive at position solutions. These systems provide 95% positioning accuracies on the order of a few meters. The precision of the L1 carrier phase measurement has been used to improve the performance of DGPS. Using carrier smoothed code techniques, DGPS performance improves to the meter level.

Further improvements are achieved through the use of kinematic DGPS. Kinematic DGPS, or differential carrier phase GPS, refers to using the differentially corrected carrier phase measurements, possibly in addition to the code phase. Due to the short wavelength of the L1 carrier phase (about 19 centimeters), these measurements are extremely precise, on the order of several millimeters. Although the measurements can be corrupted slightly by error (sources, the potential accuracy of kinematic positioning is on the centimeter level. However, the carrier phase measurement has an integer cycle ambiguity associated with it. This ambiguity arises from the fact that each cycle of the carrier phase is indistinguishable from the others; before centimeter level positioning can be achieved, the ambiguity must be resolved.

Some kinematic DGPS systems use a common clock to process carrier signal information from multiple antennas. This allows for position solutions with carrier signals from less than four satellites if the relative fractional phase delay associated with the carrier signal information from the various antennas is known or can be derived.

Traditionally, the process for calibrating or deriving the relative fractional phase delay involves using the GPS signals themselves. GPS-derived line bias estimates are calculated and averaged over a long time in order to find an accurate line bias in spite of error sources such as multipath corruption.

SUMMARY OF THE INVENTION

The problem with these existing solutions for deriving the line bias is that they are not real-time. Conventional solutions for the line bias calibration take time to converge to an accurate value. Moreover, if the cables break and are replaced or repaired, the calibration must be performed again. Furthermore, these solutions, since they involve time averages, typically cannot address changes in the line bias due to variations shorter than the period over which the averages are made, such as from thermal effects, for example.

The present invention is directed to the problem of line bias. Some embodiments are directed to utilizing signal processing and judiciously selecting a frequency plan in the position detection systems to either enable the derivation of the line bias, or make the measurements insensitive to line bias. Other embodiments are directed to measurement schemes for deriving the line bias, thereby enabling a position detection system to use line bias information in order to find a position solution.

For the purposes of this invention and following discussion, determining a position of an antenna means either determining the absolute or relative position of that antenna. Absolute position means the coordinates of the antenna in the context of a local or global coordinate system as WGS-84. (WGS 84 is an earth fixed global reference frame, which is defined by a set of primary and secondary parameters in which the primary parameters define the shape of an earth ellipsoid, its angular velocity, and the earth mass and the secondary parameters define a detailed gravity model of the earth.) Relative position usually means relative to another antenna, whether associated with the same GPS receiver or another GPS receiver.

In general, according to one aspect, the invention features a differential position detection system having a line bias compensation capability. This system uses an antenna adapter module that generates a compensation signal and functions as an interface between the receiver and the antenna. The antenna communication path transmits the common clock signal to the antenna adapter module and the intermediate frequency signal and the compensation signal to the receiver. In general, the antenna adapter module is on the antenna side of the communications path. A line bias compensation module is then provided for determining a correction to the phase of the intermediate frequency signal in response to the compensation signal, which signal delay is used by the receiver to determine the position information.

In the typical embodiment, the line bias compensation module determines the correction by determining a measured fractional phase of the intermediate frequency signal. A specific relationship between the frequency of the intermediate signal $f_{IF}$ and the compensation signal $f_{TF}$ in relation to the carrier signal frequency $f_{RF}$ is used. Specifically, $2f_{IF}-f_{RF}\approx 2nf_{TF}$, where n is an integer, positive, negative, or zero. As a general rule, $2f_{IF}-f_{RF}$ is within 10% of $2nf_{TF}$.

In general, according to another aspect, the invention features a differential position detection system having line bias insensitivity. Specifically, a receiver determines position information for antennas in response to a clock signal and intermediate frequency signals from the antennas.

At least one antenna adapter module is used for interfacing between one of the antennas and the receiver. This module generates the intermediate frequency signal. At least one antenna communication path provides for the transmission of the clock signal to the antenna adapter module and for the transmission of the intermediate frequency signal to the receiver.

According to this embodiment of the invention, the intermediate frequency signal is approximately one-half the frequency of the carrier signals. By making this selection, the position detection system is no longer sensitive to line bias.

The required accuracy of the frequency of the intermediate signal to the carrier signals is usually dictated by the requirements of the application. The expression for phase delay is $T*(f_{IF}-f_{RF})$, where T is the delay through the cable, $f_{RF}$ is the frequency of the carrier signal and $f_{IF}$ is the frequency of the intermediate frequency signal. Thus, the error is function of the cable length.

For example, if an acceptably small error for a given application is 0.01 cycles, then $(f_{IF}-f_{RF})$ should generally be less than 0.01/T where T is the delay through the cable. As a general rule, $2f_{IF}-f_{RF}$ is within 10% of $2nf_{TF}$.

In general, according to another aspect, the invention features a specified-delay antenna communications cable for a position detection system. This communications cable connects an antenna to a receiver. This receiver uses a delay of the communications cable to determine position information for the antenna in a differential GPS system.

In one embodiment, the delay of the communications cable is determined using a signal transmission analysis scheme such as time or frequency domain reflectometry. These schemes typically involve the transmission of a step or impulse signal or a swept frequency signal through the line and measurement of the round trip delay or Fourier analysis of that signal. In another example, the delay for cable is determined by transmitting multiple signals through the cable and measuring the respective phase delays. These multiple frequencies are used to derive the fractional phase delay at the frequency of the intermediate signal.

In still another embodiment, the delay of the communications cable is determined in a factory then this factory-specified delay is entered into the position detection system such as via a user interface or automatically by the system interrogating the cable.

In both of these embodiments, thermal sensitivity information is ideally further provided to and stored in the receiver. This information relates a delay or change in delay of the cable to a temperature, such as an ambient temperature or a temperature of the cable.

In general, according to still another aspect, the invention features a method for determining the relative position of a first antenna and a second antenna, the first-antenna being connected to a receiver via a first cable and the second antenna connected to the receiver via a second cable. This method comprises generating differential carrier phase measurements between the first and second antennas by transmitting signal information bi-directionally between the receiver and the first and second antennas, measuring phases of at least some of said signal information for the first and second antennas, and subtracting phases for the second antenna from phases for the first antenna. The relative positions of the first and second antennas are calculated from the differential carrier phase measurements.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 1B is a schematic diagram showing a differential GPS system showing daisy-chained receivers;

DETAILED DESCRIPTION OF THE PREFERRED EMBODIMENTS

Figure 1A:
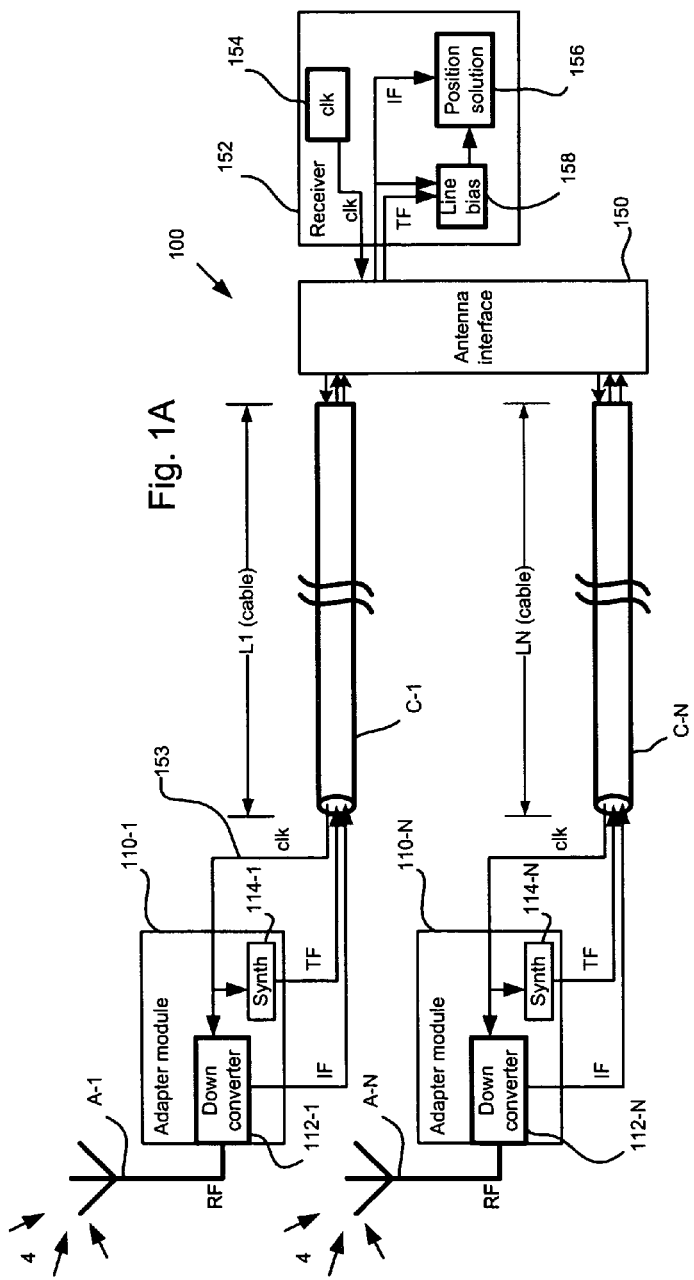
FIG. 1A is a schematic diagram showing a differential GPS system including the inventive line bias measurement system providing for bias compensation, according to a first embodiment.

FIG. 1A is a schematic block diagram showing a differential GPS system providing for line bias measurement and compensation, which system has been constructed according to the principles of the present invention.

In more detail, the position detection system 100 generally comprises a series of antennas A-1 to A-N. At least one antenna is required, whereas many systems can also include two or more antennas. These antennas A-1 to A-N receive carrier signals 4, typically from a satellite positioning or navigation system such as the GNSS and/or from one or more ground-based transmission sources such as pseudolites. Such carrier signals can actually come from many radio frequency (RF) sources, including those not intended for navigation.

Such transmitters would include, but not be limited low earth orbiting (LEO) satellites or high definition television (HDTV) broadcast stations.

The antennas A-1 to A-N communicate with a common receiver 152, although in other configurations other receivers could be used. In one embodiment, an antenna interface 150 is provided, having separate radio frequency stages and channels for processing the carrier signal information from the antennas A-1 to A-N. In another implementation, a multiplexer is used to selectively connect the receiver 152 to the separate antennas A-1 to A-N.

A common clock 154, usually of the receiver 152, is used as a reference to process carrier signal information from the antennas A-1 to A-N to thereby enable differential carrier phase GPS position detection.

Each of the antennas A-1 to A-N connects to the receiver 152 via a respective antenna adapter module 110-1 to 110-N. In this particular embodiment, these adapter modules 110-1 to 110-N have separate down converters 112-1 to 112-N that down-convert the radio frequency (RF) carrier signals to an intermediate frequency signal IF. This down conversion can be accomplished, for example, via low side mixing with the common clock signal clk 153 from the clock 154 of the receiver 152.

In more detail, in one embodiment, the down converters 112-1 to 112-N synthesize a LO signal, preferably from the clock signal clk 153 and also preferably a multiple of the frequency of the clock. The LO signal is used to heterodyne the carrier signals and obtain a lower frequency difference signal i.e., low side mixing. Specifically, this LO signal is used to produce the intermediate frequency signal IF.

It should be noted that each of the antenna adapter modules 110-1 to 110-N may have its own slave clock that are used to process the carrier signal information. Each of these slave clocks essentially functions in response to a common clock signal such as the receiver clock clk 153 generated by clock module 154 at the receiver 152.

A number of other implementations also exist for the common clock. Generally, the common clock means that the receiver 152 is not required to solve for a time unknown when solving for relative position of the antennas A-1 to A-N. There are a number of ways to achieve this common clock processing. For example, down-conversion of the detected carrier signals can be performed for all antennas using the same local oscillator (LO) signal or local oscillators derived from, or phase locked to, a common oscillator. Another example relies on the derivation of the phase of a common signal using independent clocks for processing that common signal. Specifically, with reference to FIG. 1B, one can daisy chain multiple dual antenna receivers 152 between successive antennas A-1 to A-4 such that the receivers 152 process information from common antennas. In the illustrated example, receiver A receives carrier signal information from antennas A-1 and A-2, receiver B receives carrier signal information from antennas A-2 and A-3, receiver C receives carrier signal information from antennas A-3 and A-4, receiver D receives carrier signal information from antennas A-4 and A-1. Thus, since the receivers 152 obtain the phase for a satellite carrier signal 4 received on a shared antenna, they can compensate for the difference in clock error between them. In still another example, a common signal is injected into all of the signals from the antennas and a measurement of the phase of that common signal made using each independent clock.

Returning to FIG. 1A, cables C-1 to C-N provide the antenna communications path between the antennas A-1 to A-N and the receiver 152. Each of these cables C-1 to C-N has a characteristic length L1 to LN. These lengths create corresponding delays in the transmission of the clock signal clk 153 from the receiver clock 154 to the antenna adapter modules 110-1 to 110-N and a delay in the transmission of the intermediate frequency IF from the antenna and/or antenna adapter module to the receiver 152. The antenna adapter module can optionally be integrated with the corresponding antenna.

Without knowing the delay associated with these cables C-1 to C-N, the carrier signal of an additional common satellite or pseudolite is required for a position module 156 of the receiver 152 to generate a position solution.

According to the invention, however, the position detection system 100 is provided with a line bias compensation module 158 for calculating a correction to the intermediate frequency signal phase that causes the fractional measurement of the intermediate signal to be insensitive to a delay of the antenna communications paths C-1 to C-N and providing this information to the position module 156.

Specifically, in this embodiment, each of the antenna adapter modules 110-1 to 110-N is provided with a synthesizer 114-1 to 114-N. This synthesizer generates a compensation or tone signal TF at another frequency $f_{TF}$. In the present embodiment, the compensation signal TF is generated in response to the clock signal clk 153. This compensation signal TF is received by the line bias compensation module 158 in the receiver 152. With this information, the line bias compensation module 158 derives the fractional cycle delay associated with each of the cables C-1 to C-N, which information is used to derive the line bias by the position solution module 156 to generate the position solution.

In other embodiments, one synthesizer is placed in the receiver 152. This is possible because there are two frequencies synthesized from the clock signal clk 153, the LO signal and the compensation tone. So two frequencies are sent up the cable in this embodiment. Also, care needs to be taken to isolate the tone signal that is sent up the cable from the tone received from the antenna. Further, this embodiment requires higher frequency signals to be transmitted over the cable, increasing its expense. Having the synthesizers at the antenna gives more flexibility in this area.

Figure 2:
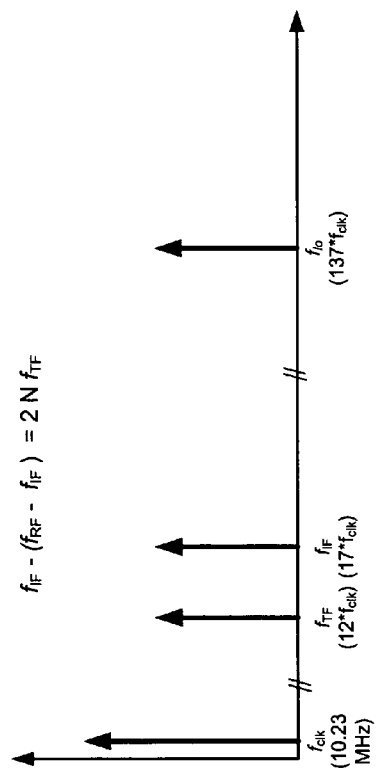
FIG. 2 is a spectral plot showing one possible relationship between the signals of the line bias measurement system, according to the first embodiment.

FIG. 2 illustrates a possible relationship between the intermediate frequency signal IF, carrier signal RF, and the compensation tone signal TF.

Specifically, signal frequencies have the following relationship: $f_{IF} - (f_{RF} - f_{IF}) = 2nf_{TF}$, where n is an integer ( . . . $-3$, $-2, 1, 0, 1, 2, 3$ . . . ), $f_{IF}$ is the frequency of the intermediate signal, $f_{TF}$ is the frequency of the compensation tone signal, and $f_{RF}$ is the frequency of the carrier signal frequency.

The result is the measured fractional phase delay of the intermediate frequency signal IF, in a low side mixing scheme.

$f_{clk}$=frequency of the clock clk, which is sent up the cable;

$f_{lo}$=LO signal frequency=$k*f_{clk}$ (k is an integer)=$f_{RF}-f_{IF}$;

$f_{IF}$=frequency of the intermediate signal IF, which is sent down the cable;

$f_{TF}$=harmonic tone sent back down cable (=$n*f_{clk}$) (n is an integer); and T=time delay through cable.

The phase delay of the tone will be $2*T*f_{TF}$. The phase delay of the IF signal due to the cable will be $T*(f_{IF}-f_l)$. If $f_{IF}-f_l=n*2*f_{TF}$, the fractional phase delay of the IF signal can be predicted from the measurement of the tone phase.

The following are three exemplary frequency plans:

Plan 1

$f_{clk}=71.61$ MHz $(=7*10.23$ MHz$)$ $f_{lo}=19*f_{clk}$ $f_{IF}=3*f_{clk}$ $f_{TF}=2*f_{clk}$ $f_{IF}-f_{TF}2-16*f_{clk}=-4*2*2*f_{clk}=-4*2*f_{TF}$ Plan 2

$f_{clk}=71.61$ MHz $(=7*10.23$ MHz$)$ $f_{lo}=20*f_{clk}$ $f_{IF}=2*f_{clk}$ $f_{TF}=3*f_{clk}$ Plan 3

$f_{clk}=10.23$ MHz $f_{lo}=137*f_{clk}$ $f_{IF}=17*f_{clk}$ $f_{IF}-f_{T}=120*f_{clk}$ $f_{TF}=12*f_{clk}(N=5)$ Other frequency plans are also possible, these being only a few examples.

In a preferred embodiment, the clock signal clk 153 sent up the cable and the intermediate frequency signal IF and the compensation signal TF sent down the cables C-1 to C-N are less than 650 MHz. Such frequencies are low enough in frequency to reliably pass through shielded category six (CAT-6) twisted pair cables.

Figure 3:
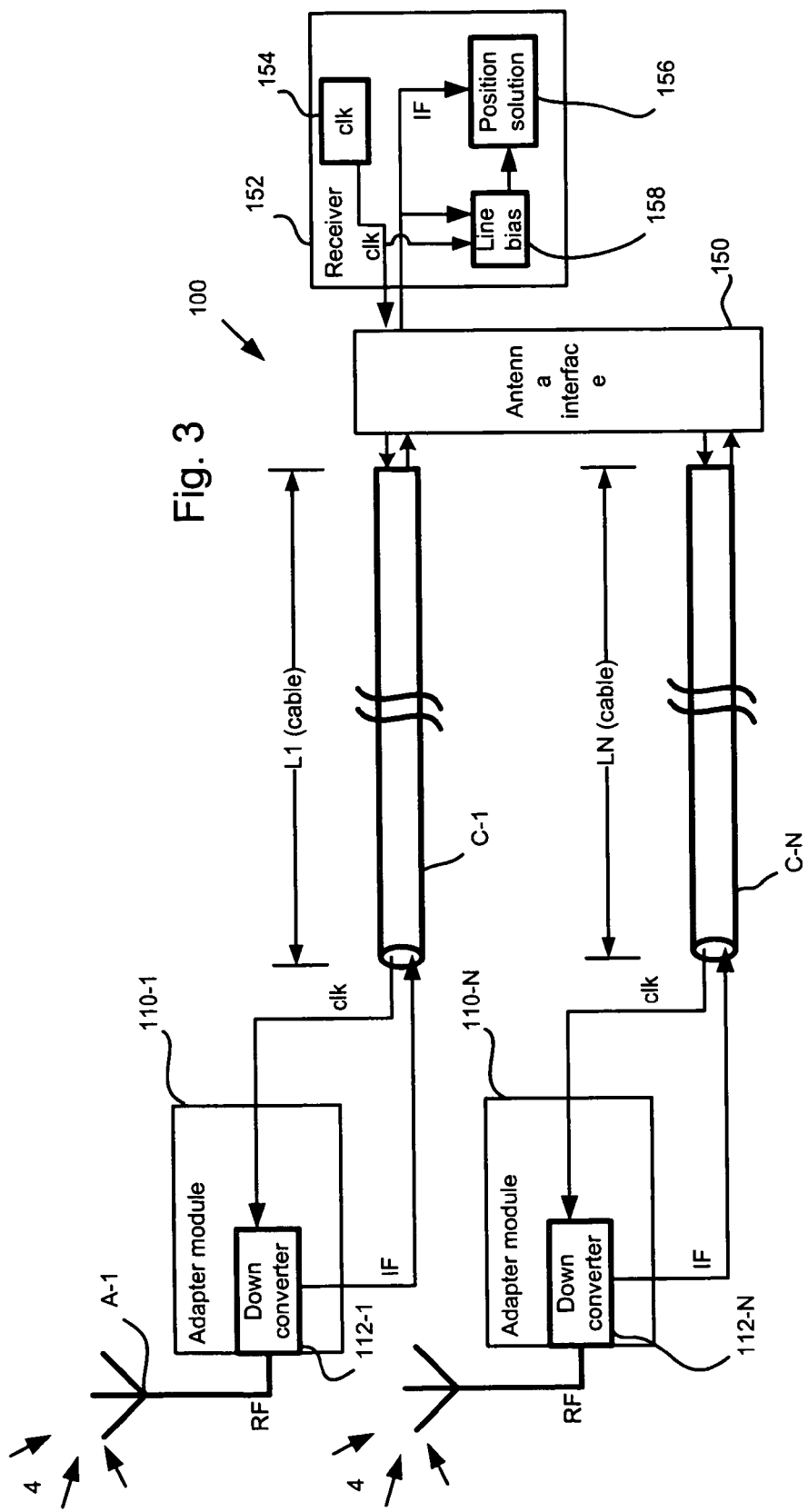
FIG. 3 is a schematic diagram showing a differential GPS system including the inventive line bias system providing for bias insensitivity, according to a second embodiment.

FIG. 3 shows an alternative embodiment, which is insensitive to line bias. The antennas A-1 to A-N supply the carrier signals RF, which are received by corresponding down converters 112-1 to 112-N of the antenna adapter modules 110-1 to 110-N. These down converters 112-1 to 112-N generate the intermediate frequency signal IF in response to the clock signal clk 153 generated by the clock 154 of the receiver 152. The intermediate frequency signal IF and the clock signal clk 153 are transmitted between the antenna adapter modules 112-1 to 112-N via cables C-1 to C-N.

In this embodiment, the intermediate frequency signal IF is derived from low side mixing of the carrier signal RF and is selected to be substantially one-half the frequency of the carrier signal, $f_{IF}=0.5$ ($f_{RF}$). The signal $f_{RF}$ could be GPS L1, L2, L5, other GNSS carrier frequencies, or other radio-navigation carrier frequencies. Such carrier frequencies may also include, but not be limited to, ISM bands such as 900 MHz and 2.4 GHz, or radio locations band such as 9.5 to 10.0 GHz.

The following analogy explains how this frequency selection results in delay insensitivity, with doppler error being analogous to phase error and range error rate being analogous to cable delay. For the case of the $f_{RF}/2=f_{IF}$, assume that the receiver is at the origin of a two dimensional coordinate system, the antenna A is moving 900 GPS L1 cycles per second in the x-axis direction and the satellite that is being tracked is at y=∞ (infinity), so its frequency is $f_{RF}=f_{L1}=1575.42$ MHz (and the range to that satellite is substantially invariant as the antenna moves in the x-axis direction). Thus, the measurement of the range rate of change to the satellite is zero. Further assume that a LO signal of $f_{RF}/3$ is sent up to the antenna adapter module 110 from the receiver 152 and mixed the satellite signal RF with that LO signal to derive an intermediate signal IF of $2*f_{RF}/3$. Because the antenna assembly is moving away from the receiver, the LO signal that it derives will be L1/3−300 Hz (because 900 L1 cycles=300 L1/3 cycles). Therefore, the intermediate signal IF that it derives will be 2*L1/3+300 Hz. That intermediate IF is broadcast back to the receiver 152 being received with a frequency of 2*L1/3+300−600=2*L1/3−300. This frequency measurement is wrong due to the combined effect of the doppler on the LO signal and the intermediate frequency signal IF. However, if the intermediate frequency signal IF that is sent down is 0.5 ($f_{RF}$), the same example becomes:

Broadcast LO=L1/2

Received LO=L1/2−450.

Transmitted IF=L1−(L1/2−450)=L1/2+450

Received IF=L1/2+450−450=L1/2 (not affected by Doppler shift)

By selecting this relationship, carrier phase of the intermediate frequency signal measured at the receiver 152 is independent of the delay through the cables C-1 to C-N.

Figure 4:
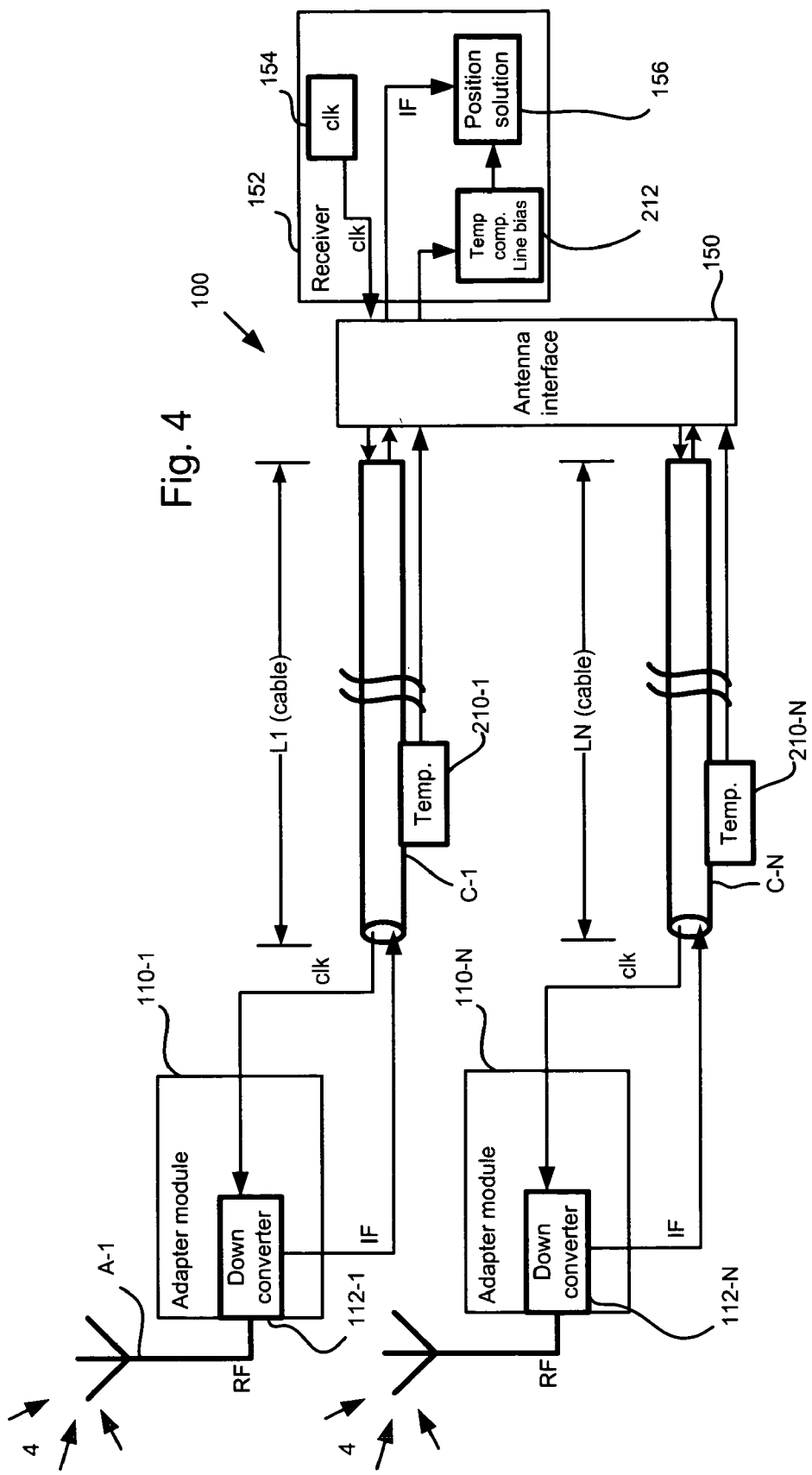
FIG. 4 is a schematic diagram showing a differential GPS system including the inventive line bias compensation system providing for temperature compensation, according to a third embodiment.

FIG. 4 shows a line bias compensation system that provides for temperature compensation. In this embodiment, temperature detectors 210-1 to 210-N are provided to measure the ambient temperature for the cables C-1 to C-N. In other embodiments, the temperature detectors 210-1 to 210-N are connected to the housing of the cables C-1 to C-N to sense the actual temperature of the cables. In still other embodiments, one ore more temperature sensor are used to measure the outside temperature where the cables are located outside, for example.

The temperature information from the temperature sensors 210-1 to 210-N is transmitted to the receiver 152 via the antenna interface 150, or optional multiplexer. Information is received at a temperature compensation line bias module 212. This provides line bias information, which usually indicates the change in the line bias with the detected temperature, to the position solution module 156.

Specifically, in one embodiment, the temperature compensation line bias module 212 stores the change in line bias as a function of temperature, using a look-up table or algorithmically. This allows the system 100 to be exposed to various environmental extremes that will cause expansion and/or contraction in the cables C-1 to C-N yet still compensate for any changes in the lengths L1 to LN or line biases of the cables C-1 to C-N.

Figure 5:
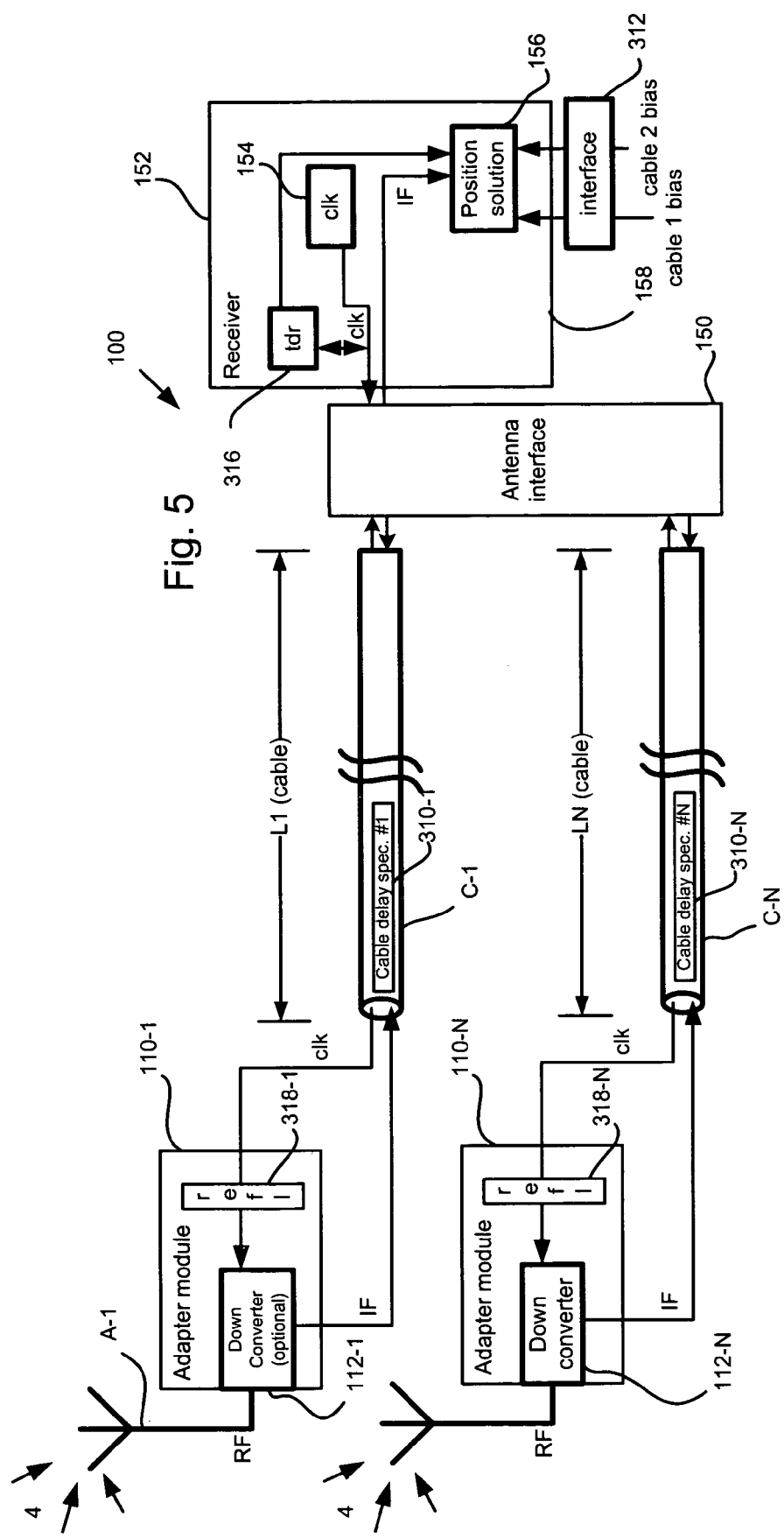
FIG. 5 is a schematic diagram showing a differential GPS system including the inventive line bias compensation system, according to other embodiments.

FIG. 5 shows other embodiments of the line bias compensation system.

In the illustrated embodiment, the downconverters 112-1 to 112-N are shown in the adapter modules 110-1 to 110-N. However, when a measurement of absolute cable delay is available, the downconversion can be performed conventionally, in the receiver 152. Doing downconversion in the receiver is generally preferred in such a system.

According to one example, each of the cables C-1 to C-N is provided with a cable delay specification 310-1 to 310-N. In one example, this cable delay specification is provided with each cable, such as on the cable's jacket, using a bar code, for example. In other examples, the cable delay specification is provided by a radio frequency identification (RFID) tag or read only memory ROM device, for example, that is attached to or associated with the cable C-1 to C-N. The information is supplied in the factory where the delay and/or length associated with the cable is measured. As an alternative to providing the delay, the cables can be sized or otherwise constructed such that all cables have the same nominal delay.

Thus, during the deployment of the cable, an operator, reading or scanning the cable delay specifications 310-1 to 310-N, enters the corresponding cable biases or length L1 to LN for cables C-1 to C-N into the receiver 152 via a user interface 312 for example. In other examples, where the information is stored in the RFID or ROM device, the information is preferably directly read out by the system 100. This allows the position solution module 156 to derive a position solution that compensates for the line biases of cables C-1 to C-N. In some implementations, the cable delay specifications 310-1 to 310-N further map the cable bias as a function of temperature so that the position solution module is able to further temperature compensate the cable lengths L1 to LN and associated line biases due to any changes in temperature.

In a different embodiment, these cable line biases may not be provided a priori. Instead, the receiver 152 is provided with a line bias detector module 316.

In one implementation, this line bias detector module 316 is a time or frequency domain reflectometry system that transmits a known signal such as an impulse or step function or frequency swept signal through to the antenna interface or multiplexer 150. These signals are transmitted through the cables C-1 to C-N to signal reflectors 318-1 to 318-N if required in or near each of the adapter modules 112-1 to 112-N. The FDR or TDR signal is then reflected and detected by the bias detection module 316 in the receiver 152. By comparing the time and/or frequency characteristics of the transmitted and reflected signals, the line bias compensation module is able to measure the line bias associated with each of these cables C-1 to C-N. Thus, the bias detection module is able to resolve absolute delay in the cable. This bias information is thereafter transmitted to the position solution module 156.

In an alternative embodiment, the line bias detection module comprises a tool that generates multiple frequencies allowing the differential phase delay to be calculated and from that information derive the line biases.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for determining the relative position of a first antenna and a second antenna, the first antenna being connected to a receiver via a first communication path and the second antenna connected to the receiver via a second communication path, the method comprising:
   a. generating differential carrier phase measurements between the first and second antennas by
      i. transmitting signal information bi-directionally between the receiver and at least one of the first and second antennas over the first communication path and/or the second communication path;
      ii. measuring phases of at least some of said signal information for the first and second antennas; and
      iii. using differences between the phases for the second antenna and phases for the first antenna to correct for differences in transmission delay over the first communication path and the second communication path;
   b. calculating the relative position of the first and second antennas from the differential carrier phase measurements generated in step a.

2. The method of claim 1, wherein the first and second antennas are configured to receive GNSS signals.

3. The method of claim 1, wherein the step of transmitting signal information comprises:
   transmitting a clock signal from the receiver to the first and second antennas; and
   transmitting an intermediate frequency from the antennas to the receiver.

4. The method of claim 1, wherein the step of transmitting signal information comprises:
   transmitting a clock signal from the receiver to the first and second antennas; and
   transmitting a down-converted GNSS signal from the antennas to the receiver.

5. The method of claim 4, wherein the step of transmitting the down-converted GNSS signal comprises down-converting a received GNSS signal to substantially half the frequency at which it was received at the first and second antennas.

6. The method of claim 1, wherein the step of transmitting signal information farther comprises transmitting a first compensation signal from the first antenna to the receiver and a second compensation signal from the second antenna to the receiver.

7. The method of claim 6 wherein the first compensation signal and the second compensation signal are a harmonic of the clock signal.

8. A system for determining the relative position of a first antenna and a second antenna, comprising:
   a receiver;
   a first communication path connecting the first antenna to the receiver; and
   a second communication path connecting the second antenna to the receiver;
   wherein the receiver generates differential carrier phase measurements between the first and second antennas using signal information transmitted bi-directionally between the receiver and at least one of the first and second antennas over the first communication path and the second communication path and generating a difference between the phases for the second antenna relative to the phases for the first antenna to correct for differences in transmission delay over the first communication path and the second communications path and calculates the relative position of the first and second antennas from the differential carrier phase measurements.

9. The system of claim 8, wherein the first and second antennas are configured to receive GNSS signals.

10. The system of claim 8, wherein the receiver transmits a clock signal to the first and second antennas and receives an intermediate frequency from the antennas.

11. The system of claim 8, wherein the receiver transmits a clock signal to the first and second antennas and receives a down-converted GNSS signal from the antennas.

12. The system of claim 11, wherein the down-converted GNSS signal is at substantially half the frequency at which it was received at the first and second antennas.

13. The system of claim 8, wherein the receiver receives a first compensation signal from the first antenna and a second compensation signal from the second antenna.

14. The system of claim 13 wherein the first compensation signal and the second compensation signal are a harmonic of a clock signal.

* * * * *

UNITED STATES PATENT AND TRADEMARK OFFICE
CERTIFICATE OF CORRECTION

PATENT NO. : 7,489,270 B2  Page 1 of 1
APPLICATION NO. : 11/106962
DATED : February 10, 2009
INVENTOR(S) : David Gary Lawrence et al.

It is certified that error appears in the above-identified patent and that said Letters Patent is hereby corrected as shown below:

In Column 10, Claim 6, Line 20, delete "farther" and insert --further--.

Signed and Sealed this

Fifth Day of May, 2009

JOHN DOLL
*Acting Director of the United States Patent and Trademark Office*